(12) United States Patent
Blume

(10) Patent No.: US 6,920,266 B2
(45) Date of Patent: Jul. 19, 2005

(54) INTEGRATED OPTICAL DIRECTIONAL COUPLER

(75) Inventor: Oliver Blume, Stuttgart (DE)

(73) Assignee: Avanex Corporation, Fremont, CA (US)

( * ) Notice: Subject to any disclaimer, the term of this patent is extended or adjusted under 35 U.S.C. 154(b) by 193 days.

(21) Appl. No.: 10/326,557

(22) Filed: Dec. 23, 2002

(65) Prior Publication Data

US 2003/0133660 A1 Jul. 17, 2003

(30) Foreign Application Priority Data

Jan. 16, 2002 (EP) .......................................... 02360032

(51) Int. Cl.⁷ ............................................... G02B 6/26
(52) U.S. Cl. ............................. 385/43; 385/28; 385/42
(58) Field of Search .............................. 385/43, 41, 42, 385/39, 31, 28, 27, 14, 15

(56) References Cited

U.S. PATENT DOCUMENTS

| | | | | |
|---|---|---|---|---|
| 4,822,128 A | * | 4/1989 | Imoto et al. ................... | 385/43 |
| 5,048,909 A | * | 9/1991 | Henry et al. ................... | 385/27 |
| 5,093,876 A | * | 3/1992 | Henry et al. ................... | 385/28 |
| 5,165,001 A | | 11/1992 | Takagi et al. | |
| 5,247,594 A | | 9/1993 | Okuno et al. | |
| 5,526,453 A | | 6/1996 | Wolf et al. | |
| 5,719,976 A | | 2/1998 | Henry et al. | |
| 5,875,272 A | * | 2/1999 | Kewitsch et al. .............. | 385/37 |
| 5,940,556 A | * | 8/1999 | Moslehi et al. ................ | 385/28 |
| 6,038,359 A | * | 3/2000 | Moslehi et al. ................ | 385/42 |
| 6,201,909 B1 | * | 3/2001 | Kewitsch et al. .............. | 385/37 |
| 6,236,782 B1 | * | 5/2001 | Kewitsch et al. .............. | 385/43 |
| 6,289,699 B1 | * | 9/2001 | Kewitsch et al. .............. | 65/406 |
| 6,483,967 B2 | * | 11/2002 | Tang et al. .................... | 385/43 |
| 6,687,424 B1 | * | 2/2004 | Gerdt et al. ................... | 385/12 |
| 6,723,054 B1 | * | 4/2004 | Baruch et al. ............... | 600/500 |

FOREIGN PATENT DOCUMENTS

| | | |
|---|---|---|
| DE | 37 13 658 A1 | 11/1988 |
| EP | 0 598 622 A1 | 5/1994 |
| EP | 0 625 719 A1 | 11/1994 |

OTHER PUBLICATIONS

Patent Abstracts of Japan, Publication No. 03071119 A, Mar. 26, 1991, Application No. 01206929, filed Aug. 11, 1989, Nippon Telegr & Teleph Corp.

Wenger G et al: "Design and Fabrication of Monolithic Optical Spot Size Transformers (MOST's) for Highly Efficient Fiber–Chip Coupling" Journal of Lightwave Technology, IEEE, New York, US, Bd. 12, Nr. 10, Oct. 1, 1994, pp. 1782–1790., XP000469536.

* cited by examiner

Primary Examiner—Kianni C Kaveh
(74) Attorney, Agent, or Firm—Moser, Patterson & Sheridan, L.L.P.

(57) ABSTRACT

The construction of directional couplers according to the invention with the aid of integrated optical waveguides makes it possible to produce such directional couplers in series very compactly and relatively easily. In this connection, the integrated optical waveguides in the coupling region have a smaller cross section than the cross section outside the coupling region. Consequently, it is possible to keep the spacing of the waveguide segments in the coupling region of a directional coupler according to the invention sufficiently far away from one another to minimize the error tolerance conditions in the manufacturing process. This is particularly advantageous if the difference in the refractive indices between the core of the integrated optical waveguide and its surroundings is very large.

10 Claims, 1 Drawing Sheet

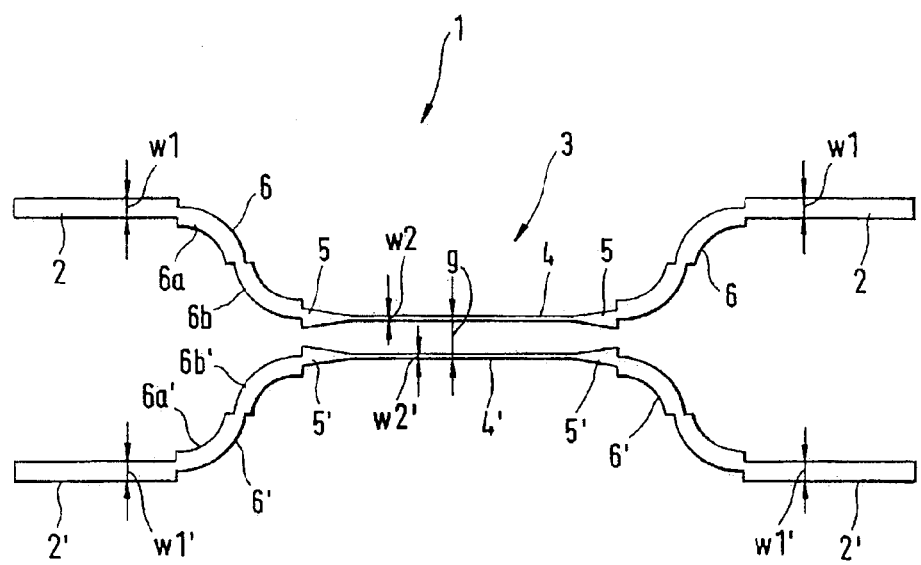

INTEGRATED OPTICAL DIRECTIONAL COUPLER

TECHNICAL FIELD

The invention relates to a directional coupler comprising at least two optical waveguides that are integrated on a substrate and that have waveguide segments directed toward each other and a coupling region formed from waveguide segments extending close to one another and also to an optical component. The invention is based on a priority application EP 02 360 032.3 which is hereby incorporated by reference.

BACKGROUND OF THE INVENTION

The constantly increasing bandwidth demand is motivating the telecommunication operators to expand their phase-optical networks rapidly. Accordingly, optical circuits in networks in which signals are processed completely optically are increasing in importance. The application of optical circuits makes it possible to reconfigure or restore a network in the optical sector. The chosen construction of such circuits comprises integrated planar waveguides in order to keep the space requirement needed for this purpose as small as possible so that a plurality of such circuits can be linked together relatively easily. A switching matrix can consequently be constructed on a single compact optical component.

An important element of many such switching matrices is the integrated directional coupler. In this connection, a plurality of waveguides, generally two, is structured on a substrate, for example of silica, in such a way that they have a coupling region. Said coupling region comprises waveguide segments that extend sufficiently near to one another in order to make it possible for optical signals that are conducted along an optical waveguide to be coupled over completely or partly into the adjacent optical waveguide in the coupling region.

The first directional couplers were produced in non-integrated technology with the aid of fibres. For example, DE 37 13 658 discloses a bundle of optical fibres that are first closely combined in the coupling region (for example by twisting the fibres together). They are then heated until they melt in this region and drawn apart. As a result of this drawing process, the fibres in the coupling region become thinner and the cores of the fibres move closer together. In this process, the cross-sectional areas of the individual fibres decrease. Mention is made of "taper". However, it has emerged that the production of purely optical-fibre fused couplers is extremely difficult, particularly if it is to be completely reproducible.

This explains, inter alia, the effort made to copy optical directional couplers with the aid of integrated waveguides. JP 030071119 discloses a typical example of a directional coupler that comprises two optical waveguides integrated on a substrate. In this case, the optical waveguides extend approximately in parallel and, at the outputs, are at a sufficiently large spacing between the two optical waveguides to guarantee connection of optical components without difficulty. Typically, the directional coupler has a coupling region in which the two optical waveguides are structured sufficiently closely in order to make possible a light propagation from one waveguide to the other waveguide. The spacing of the two optical waveguides in the coupling region is for this purpose smaller by a multiple than the distance of said two optical waveguides at their outputs.

Accordingly, the integrated optical waveguides are provided with a curvature in a transition region to the coupling region. Said curvature depends directly on how great the difference is between the spacing of the optical waveguides at their ends and the spacing in the coupling region. In addition, it is also determined by the area of the optical component that is available for this purpose.

Such directional couplers with integrated optical waveguides are produced, for example, in the current $SiO_2$/Si technology. In the latter, a layer ("buffer layer") of, for example, 15 $\mu$m made of $SiO_2$ is grown on a silicon substrate by oxidation under high-pressure vapour. It serves to isolate the silicon substrate, which has a very high refractive index. A second layer ("core layer") made of glass doped, for example, with phosphorous and germanium is deposited with the aid of flame hydrolysis ("flame hydrolysis deposition"—FHD) or of plasma deposition ("plasma enhanced chemical vapour deposition"—PECVD) on the oxide. In this latter layer, the optical waveguides are suitably structured, for example by dry etching. Then they are covered with a layer having a thickness of several $\mu$m of glass doped with phosphorous or boron. A typical width of the cross section of such structured optical waveguides is in the 5 to 10 $\mu$m range. Under these circumstances, the difference between the refractive index of the integrated optical waveguide and the refractive index of the surroundings is approximately $8 \times 10^{-3}$. In order to be able to conduct light, the refractive index of the integrated optical waveguide is known to be the greatest. In the case of optical fibres, this difference is normally only half as great, i.e. $4 \times 10^{-3}$.

An increase in the complexity of integrated optical components containing such optical directional couplers inevitably has the result that the efforts aimed at a compact construction become ever more important. The curved regions of the waveguides in the transition region to a coupling region cover the main proportion of the area of such integrated optical components. This is a direct consequence of the conditions to be fulfilled of a spacing between fibre inputs or fibre outputs of approximately 250 $\mu$m. Accordingly, the main limitation on the reduction in the area of integrated optical circuits is defined by the radius of curvature of the waveguides in the transition region to the coupling region of the directional coupler.

The smaller difference in refractive indices between core and cladding of, for example, $4 \times 10^{-3}$ in standard optical fibres makes possible a radius of curvature of at least 10 mm. A higher curvature (smaller radius of curvature) would result in higher losses of the transmitted optical signals as a result of the optical radiation spreading in the cladding. On the other hand, a higher difference in refractive indices, as is the case for integrated optical waveguides, makes it possible to choose a smaller radius of curvature. Accordingly, the regions at the transition to the coupling region of the directional couplers comprising such integrated optical waveguides are specified as smaller than for directional couplers made of optical fibres.

On the other hand, a higher difference in refractive indices results in a stronger guidance of the optical modes. As is known, this results in higher losses at the ends of the integrated optical waveguides that have to be coupled to optical fibres. For this purpose, the ends of the integrated optical waveguides therefore have a tapered structure ("tapering") in order to guarantee an increase in the modal field to the respective optical fibres. However, with a higher difference in refractive indices, the coupling between the two integrated optical waveguides in the coupling region is also reduced. In order not to increase the coupling region unduly as a result, the chosen spacing between the two integrated optical waveguides in the coupling region has to be smaller. This results in stricter conditions relating to the manufacturing tolerances in the production of directional couplers formed from integrated optical waveguides.

SUMMARY OF THE INVENTION

The object of the invention is to facilitate the construction of directional couplers with integrated optical waveguides without losing advantages of materials having a higher difference in refractive indices, as mentioned above.

According to the invention, the object is achieved by a directional coupler and by an optical component according to the teaching of directional coupler comprising at least two optical waveguides that are integrated on a substrate and that have waveguide segments directed toward each other and a coupling region formed from waveguide segments extending close to one another, wherein the waveguide segments are provided in the coupling region with a cross section that is smaller than the cross section of the respective waveguide segments outside the coupling region. In accordance with another embodiment of the invention, its object is achieved by optical component which has at least one directional coupler, respectively.

The structuring according to the invention of integrated optical waveguides in the coupling region of the directional coupler with a substantially smaller cross section than the cross section of the respective optical waveguides outside the coupling region makes it possible to increase the coupling appreciably. As a result, the chosen spacing of the two optical waveguides in the coupling region can be sufficiently large despite the high difference between the refractive index of the core of the optical waveguide and the refractive index of the material in which the waveguides are embedded. This markedly simplifies the structuring of directional couplers in integrated technology.

The modal field converter can be achieved by a waveguide cross section tapered gradually in the direction of the coupling region (taper). However, other constructions having gradual spreading of the waveguide or composed of segmented parts of different width could also be used to adapt the modal field. The advantageous use of such tapers in the coupling region of directional couplers makes it possible to reduce the coupling losses markedly. This makes it possible not to have to guarantee too strict manufacturing tolerance conditions without having to accept losses in the coupling in the process.

Advantageous refinements of the invention emerge from the dependent claims, the description below and the drawing.

BRIEF DESCRIPTION OF THE DRAWINGS

An exemplary embodiment of the invention is now explained further with the aid of the accompanying drawing.

In the drawing, the FIGURE shows a diagrammatic plan view of a directional coupler according to the invention.

DETAILED DESCRIPTION OF PREFERRED EMBODIMENTS

An example of a directional coupler 1 according to the invention is shown diagrammatically in the FIGURE. In this exemplary embodiment, the directional coupler 1 comprises two optical waveguides 2, 2' integrated on a substrate. Said optical waveguides 2, 2' are structured into the optical component with sufficient spacing from one another at their ends in order to make it possible to couple, for example, optical fibres to the respective ends of the optical waveguides 2, 2'. Said spacing may typically be at least 250 $\mu$m.

The directional coupler 1 has a coupling region 3 according to the invention that is formed from the waveguide segments 4, 4' of the integrated optical waveguides 2, 2', said waveguide segments 4, 4' extending close to one another. The transition from the waveguides 2, 2' to the coupling region 3 is formed by waveguide segments 6, 6' directed toward each other. Said waveguide segments 6, 6' directed toward each other typically each comprise two curved pieces 6a, 6b or 6a40, 6b40, respectively, that are each joined together with an offset and reverse curvature. The offsets are suitably selected to minimize optical signal losses.

An essential feature of the invention is to structure the waveguide segments 4, 4' in the coupling region 3 of the directional coupler 1 with a cross section w2, w2' that is substantially smaller than the cross section w1, w1' of the respective waveguide segments 6, 6' outside said coupling region 3. The factor between the cross section w2, w2' of the waveguide segments 4, 4' in the coupling region 3 and the cross section w1, w1' of the respective waveguide segments 6, 6' outside the coupling region 3 can be up to ½. This immediately results in an increase in the coupling in the coupling region 3 of the directional coupler 1. As a result, the spacing g between the waveguide segments 4, 4' in the coupling region 3 can be kept large, relatively seen, so that no unduly high requirements are imposed in the permitted error tolerances in the manufacturing process of such directional couplers 1. Said spacing g of the waveguide segments 4, 4' extending in parallel in the coupling region 3 may be specified as larger than the cross section w2, w2' of said waveguide segments 4, 4'. The spacing g may be specified as up to a value that is approximately the same as the cross section w1, w1' of the waveguides 2, 2' outside the coupling region. Possibly, the spacing g may be still greater as a function of the chosen material properties and the desired coupling.

In order to keep losses as small as possible during the transmission of optical signals by such directional couplers 1 according to the invention, it may be advantageous, as shown in the FIGURE, to structure the respective ends of the waveguide segments 4, 4' at the transition to the coupling region with ends 5, 5' that are tapered in the direction of the coupling region 3 and that serve as modal field converters ("taper"). The modal field of the transmitted optical signals is gradually increased by the sloping line at the respective tapers. This may possibly help to reduce the losses at the transition of the waveguide cross section from w1 to w2 or from w1' to w2', respectively. The length of the sloping line must be greater by a multiple than the signal wavelength in order to achieve adiabatic modal conversion. Depending on the use of such a directional coupler 1, it is not absolutely necessary to provide all the ends of the respective waveguide segments 4, 4' with a modal field converter 5, 5'.

Typical values of the cross sections w1, w1' of the waveguides 2, 2' outside the coupling region 3 and of the cross sections w2, w2' in the coupling region 3 can be between 4 to 6 $\mu$m and 2 to 3 $\mu$m respectively. In that case, the spacing g of the waveguide segments 4, 4' in the coupling region 3 may be between 2 and 5 $\mu$m. These values depend, of course, directly on the properties of the materials chosen. This means mainly the difference in refractive indices between the core of the waveguides 2, 2' and their surroundings. Said difference may assume a value of $8 \times 10^{-3}$ to over $1.2 \times 10^{-2}$.

The production of directional couplers according to the invention as described above avoids common problems, for example with the manufacturing tolerances and in the lithographic definition of the structures that would arise if the waveguide segments in the coupling region were to extend unduly close to one another. The advantageous application of modal field converters produces only small additional losses under these circumstances. The fact that very small coupling spacings can be avoided with the aid of the invention now makes it possible to produce production-tolerant directional couplers even in material systems having relatively high refractive-index difference. The small radii of curvature achievable therewith of the waveguide segments 6 and 6', and in other regions of the optical components, make it possible to integrate a higher number of such directional couplers or other components on an optical component. All this can be advantageously applied in order to form a comparatively small optical component that is equipped with a plurality of such directional couplers according to the invention, connected, for example, in series or having a combination of directional couplers with other components.

What is claimed is:

1. Directional coupler comprising at least two integrated optical waveguides that have waveguide segments directed toward each other and a coupling region formed from waveguide segments extending close to one another, wherein the waveguide segments are provided in the coupling region with a cross section that is smaller than the cross section of the respective waveguide segments outside the coupling region and with a spacing at least as large as the cross section of the waveguide segments in the coupling region, while a transition to the coupling region has at least one modal field converter.

2. Directional coupler according to claim 1, wherein the factor between the cross section of the waveguide segments in the coupling region and the cross section of the respective waveguide segments outside the coupling region is up to ½.

3. Direction coupler according to claim 1, wherein the spacing between the two waveguide segments in the coupling region has a value that is larger than the cross section of the waveguide segments in the coupling region but equal to or smaller than the cross section of the waveguide segments outside the coupling region.

4. Directional coupler according to claim 1, wherein the spacing between the two waveguide segments in the coupling region has a greater value than the cross section of the waveguide segments outside the coupling region.

5. Directional coupler according to claim 1, wherein at least one waveguide segment at the transition to the coupling region has at least one modal field converter.

6. Directional coupler according to claim 1, wherein all ends of the waveguide segments at the respective transitions to the coupling region are provided with modal field converters.

7. Directional coupler according to claim 1, wherein at least an end of at least one waveguide segment is tapered in the direction of the coupling region and serves as a modal field converter.

8. Directional coupler according to claim 1, wherein at least one of the waveguide segments outside the coupling region includes two curved pieces joined together with an offset.

9. Directional coupler according to claim 8, wherein the two curved pieces have reverse curvatures relative to one another.

10. Directional coupler according to claim 8, wherein the offset is configured to reduce optical signal loss.

\* \* \* \* \*